US006986096B2

(12) United States Patent
Chaudhuri et al.

(10) Patent No.: US 6,986,096 B2
(45) Date of Patent: Jan. 10, 2006

(54) SCALING AND QUANTIZING SOFT-DECISION METRICS FOR DECODING

(75) Inventors: Arunava Chaudhuri, San Diego, CA (US); Raj Nadakuditi, Cambridge, MA (US)

(73) Assignee: QUALCOMM, Incorporated, San Diego, CA (US)

( * ) Notice: Subject to any disclaimer, the term of this patent is extended or adjusted under 35 U.S.C. 154(b) by 131 days.

(21) Appl. No.: 10/787,003

(22) Filed: Feb. 24, 2004

(65) Prior Publication Data

US 2005/0025076 A1 Feb. 3, 2005

Related U.S. Application Data

(60) Provisional application No. 60/491,332, filed on Jul. 29, 2003.

(51) Int. Cl.
*H03M 13/45* (2006.01)
*H04L 1/00* (2006.01)
(52) U.S. Cl. ..................................... 714/780
(58) Field of Classification Search ................ 714/780
See application file for complete search history.

(56) References Cited

U.S. PATENT DOCUMENTS 5,271,042 A 12/1993 Borth et al. ............... 375/101

FOREIGN PATENT DOCUMENTS

EP 1187344 3/2002

OTHER PUBLICATIONS

Reed, et al., "Iterative Multiuser Detection for CDMA with FEC: Near-Single-User Performance", IEEE Transactions on Communications, vol. 46, No. 12, Dec. 1998, pp. 1693-1699.*

Y.K. Lee et al: "*Normalization, windowing and quantization of soft-decision Viterbi decoder inputs in CDMA*"; Vehicular Technology Conference, 1999 IEEE 49th Houston, TX, May 16, 1999, pp. 221-225.

* cited by examiner

*Primary Examiner*—Stephen M. Baker
(74) *Attorney, Agent, or Firm*—Philip R. Wadsworth; Charles D. Brown; Howard H. Seo

(57) ABSTRACT

Soft metrics for multiple bursts transmitted at different times for a data packet are scaled, quantized, and rescaled prior to decoding. As each burst is received, input soft metrics for the burst are scaled with a scaling factor S(i), quantized based on a quantization scale factor Q(i), and stored in a buffer. The scaling factor and quantization scale factor are computed based on the statistics for the burst. After all bursts for the data packet have been received, the quantized soft metrics for each burst are rescaled based on the quantization scale factor Q(i) for that burst and a common scale factor to properly weight the soft metrics in the decoding process. The common scale factor is determined based on the quantization scale factors Q(i) for all bursts. The rescaled soft metrics for all bursts are requantized, deinterleaved, and decoded to obtain decoded data for the packet.

28 Claims, 8 Drawing Sheets

SCALING AND QUANTIZING SOFT-DECISION METRICS FOR DECODING

RELATED APPLICATIONS

This application claims priority to U.S. Provisional Application No. 60/491,332 filed Jul. 29, 2003.

BACKGROUND

1. Field

The present invention relates generally to communication, and more specifically to techniques for scaling and quantizing soft-decision metrics for decoding in a wireless communication system.

2. Background

In a wireless communication system, a transmitter encodes and interleaves traffic data, typically one data packet at a time, to obtain interleaved data. The transmitter may further partition each packet of interleaved data into multiple output blocks for transmission at different times. The transmitter then modulates and transmits these output blocks over a wireless channel at the designated times. If the transmission for these output blocks is not continuous, then the transmission appears as "bursts", one burst for each output block. The wireless channel distorts each transmitted burst with a particular channel response and further degrades each transmitted burst with noise and interference.

A receiver receives the transmitted bursts and processes each received burst to obtain soft-decision metrics (or simply, "soft metrics") for the burst. A soft metric is a multi-bit value obtained by the receiver for a single-bit (or "hard") value sent by the transmitter. In one conventional method, the receiver scales the soft metrics for all received bursts for a given data packet with a single scaling factor to obtain scaled soft metrics for these bursts. The scaling factor is selected such that soft metrics with the proper amplitude are provided for subsequent processing. Typically, the scaling factor is derived based on a signal-to-noise-and-interference ratio (SNR) estimate for the bursts. The scaled soft metrics are then deinterleaved and decoded to obtain decoded data for the packet.

Scaling all of the received bursts for a data packet with a single scaling factor effectively gives these bursts equal weight in the decoding process. This is acceptable if the wireless channel is relatively static and the bursts are received with similar signal quality. However, if the bursts are transmitted at different times, then these bursts may experience different channel conditions and achieve different SNRs. In this case, scaling all bursts for a data packet with a single scaling factor results in sub-optimal decoding performance.

In another conventional method, the scaling is performed based on an average SNR obtained for multiple prior bursts. For an additive white Gaussian noise (AWGN) wireless channel with flat fading, the SNR may not change much from burst to burst, and good performance may be achieved by scaling the current burst based on the average SNR for the prior bursts. However, for a fading and interference wireless channel, the channel conditions are not static, the statistics of the soft metrics can change from burst to burst, and the SNR for the current burst may not correlate well with the average SNR for the prior bursts. Furthermore, the average SNR is not available for the first burst of a transmission or may be quite unreliable after a long period of no transmission, such as for a discontinuous transmission (DTX). Thus, decoding performance may be poor under uncertain conditions for this method.

There is therefore a need in the art for techniques to more properly scale soft metrics for bursts transmitted at different times and possibly having different statistics and signal quality.

SUMMARY

Techniques for scaling, quantizing, and rescaling soft metrics for multiple bursts transmitted at different times are provided herein. These techniques may be used for various wireless communication systems and can provide good performance for various types of wireless channel (e.g., an AWGN channel, a fading and interference channel, and so on).

For the scaling and quantizing, as each burst is received, input soft metrics for the burst are scaled with a scaling factor $S(i)$ to obtain scaled soft metrics. The scaling factor $S(i)$ is determined based on the statistics for the burst. The scaled soft metrics for the burst are quantized based on a quantization scale factor $Q(i)$ to obtain quantized soft metrics, which are stored in a buffer. The quantization scale factor $Q(i)$ is computed based on the statistics for the burst and is also saved. The scaling adjusts the values of the input soft metrics for different bursts observing different channel conditions, and quantization is such that the scaled soft metrics can be stored in minimal memory. The same processing is performed for each of $N_B$ bursts transmitted for a data packet (e.g., for a message), where $N_B > 1$.

For the rescaling, after all $N_B$ bursts for the same data packet (or message) have been received, the quantized soft metrics for each burst are rescaled based on the statistics for that burst as well as the statistics for all bursts to properly weight the soft metrics in the decoding process. In one rescaling scheme, a common scale factor is determined for all $N_B$ bursts based on the quantization scale factors $Q(i)$ for these bursts. The quantized soft metrics for each burst are then rescaled based on the quantization scale factor $Q(i)$ for that burst and the common scale factor. The rescaled soft metrics for all $N_B$ bursts are requantized, deinterleaved, and decoded to obtain decoded data for the packet.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout and wherein.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

The techniques described herein for scaling, quantizing, and rescaling soft metrics may be used for various wireless communication systems in which a data packet for a message is divided it into multiple blocks and each transmitted block may face different channel condition. For example, these techniques may be used for a Time Division Multiple Access (TDMA) system, a Code Division Multiple Access (CDMA) system, a Frequency Division Multiple Access (FDMA) system, an orthogonal frequency division multiplexing (OFDM) based system, and so on. A TDMA system may implement one or more TDMA standards such as Global System for Mobile Communications (GSM). A CDMA system may implement one or more CDMA standards such as Wideband CDMA (W-CDMA), IS-2000, IS-856, IS-95, and so on. These standards are well known in the art.

The scaling, quantizing, and rescaling techniques may be used for data transmission on the downlink and uplink. The downlink (i.e., forward link) is the communication link from a base station to a terminal, and the uplink (i.e., reverse link) is the communication link from the terminal to the base station. These techniques may be used for user-specific transmission sent on a traffic channel as well as overhead transmission sent on a control channel. For clarity, these techniques are specifically described below for user-specific transmission on the downlink in a GSM system.

Figure 1:
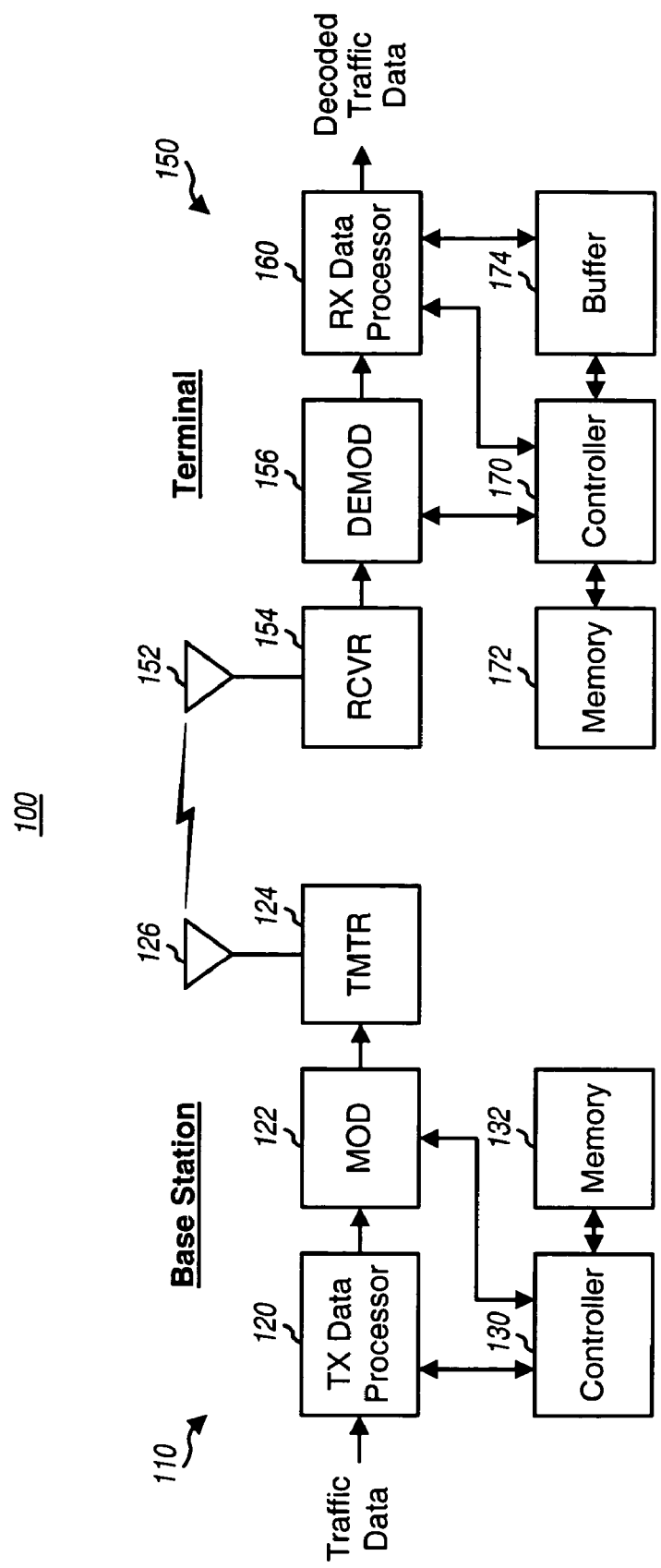
FIG. 1 shows a base station and a terminal in a wireless system.

FIG. 1 shows a block diagram of a base station 110 and a terminal 150 in a wireless communication system 100. On the downlink, at base station 110, a TX data processor 120 receives traffic data for terminal 150 as well as other terminals. TX data processor 120 formats, codes, and interleaves the data for each terminal based on the coding and interleaving schemes selected for the terminal and provides interleaved data for the terminal. A modulator (MOD) 122 then modulates the interleaved data for all terminals and provides modulated data. A transmitter unit (TMTR) 124 processes the modulated data to generate a downlink signal, which is then transmitted via an antenna 126 and over a wireless channel to the terminals.

At terminal 150, an antenna 152 receives the downlink signal transmitted by base station 110 and provides a received signal to a receiver unit (RCVR) 154. Receiver unit 154 conditions and digitizes the received signal and provides a stream of data samples. A demodulator (DEMOD) 156 processes the data samples and provides demodulated data. An RX data processor 160 next deinterleaves and decodes the demodulated data to recover the traffic data transmitted by base station 110 for terminal 150. The processing by demodulator 156 and RX data processor 160 is complementary to the processing by modulator 122 and TX data processor 120, respectively, at base station 110.

Controllers 130 and 170 direct the operation at base station 110 and terminal 150, respectively. Memory units 132 and 172 store program codes and data used by controllers 130 and 170, respectively. Buffer 174 stores data for RX data processor 160. For simplicity, FIG. 1 only shows the processing units for downlink transmission and does not show all of the processing units normally present at base station 110 and terminal 150.

GSM uses different types of channels to send different types of data. In particular, user-specific data is sent on traffic channels (TCH), broadcast data is sent on a broadcast control channel (BCCH), and control data and other data (e.g., paging messages) are sent on a common control channel (CCCH).

Figure 2:
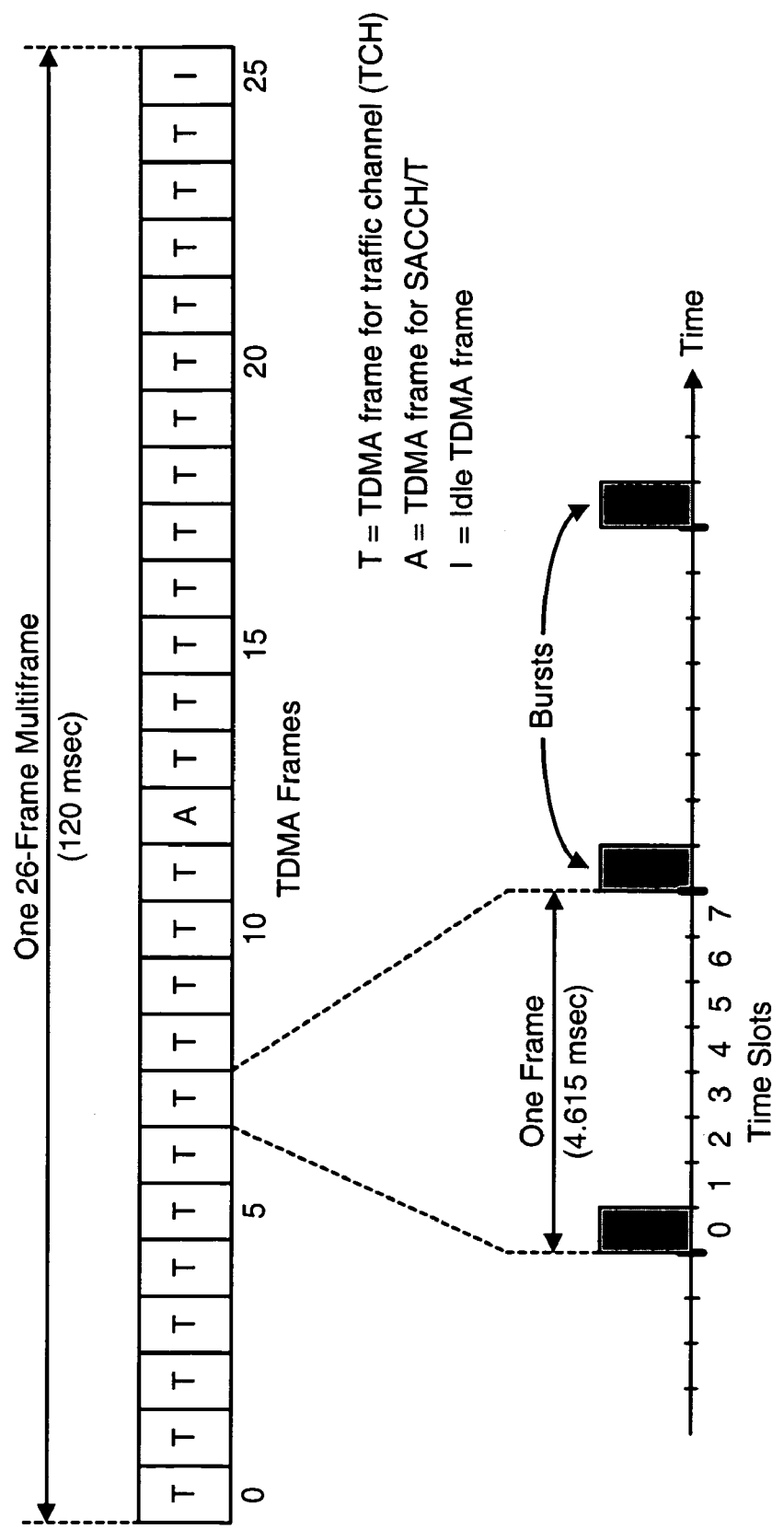
FIG. 2 shows a channel organization for the traffic channels in GSM.

FIG. 2 shows an exemplary channel organization for the traffic channels in GSM. The timeline for downlink transmission is divided into multiframes. For the traffic channels, each multiframe includes 26 TDMA frames, which are labeled as TDMA frames 0 through 25. The traffic channels are sent in TDMA frames 0 through 11 and TDMA frames 13 through 24 of each multiframe. A control channel (SACCH/T) is sent in TDMA frame 12 and is used to carry inband signaling such as (1) measurement reports sent by terminals on the uplink and (2) timing advances for the terminals sent by the base station on the downlink. No data is sent in the idle frame, which is used by the terminals to make measurements for neighbor base stations.

Each TDMA frame is further partitioned into 8 time slots, which are labeled as time slots 0 through 7. Each active terminal/user is assigned one time slot index for the duration of a call. User-specific data for each terminal is sent in the time slot assigned to that terminal and in TDMA frames used for the traffic channels (those labeled with "T" in FIG. 2). The transmission in each time slot is referred to as a "burst" in GSM. The channel organization for the traffic channels in GSM is described in detail in a document 3GPP TS 05.01, which is publicly available.

Figure 3:
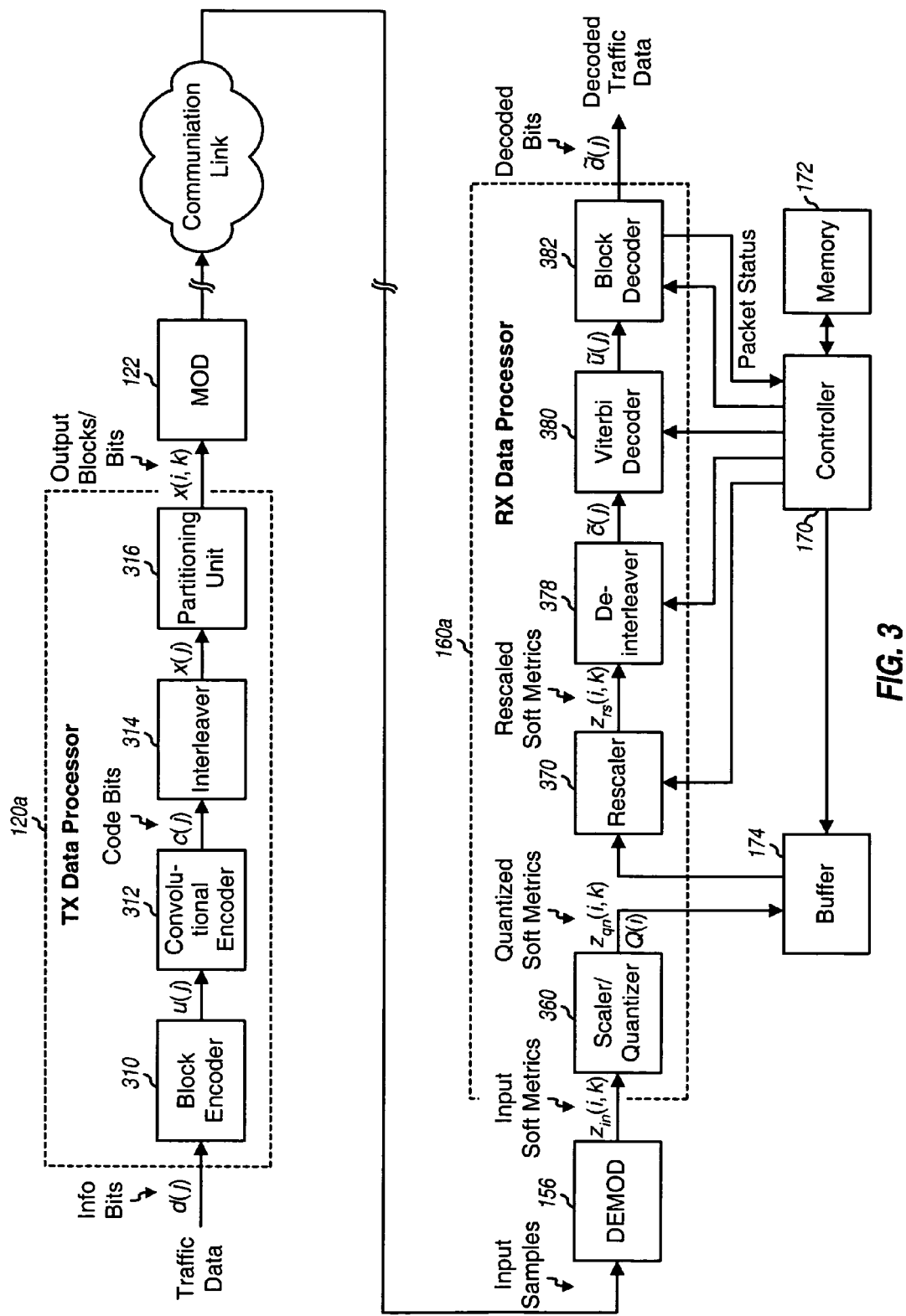
FIG. 3 shows a transmit (TX) data processor at the base station and a receive (RX) data processor at the terminal.

FIG. 3 shows a block diagram of a TX data processor 120a at base station 110 and an RX data processor 160a at terminal 150. TX data processor 120a is an embodiment of TX data processor 120 in FIG. 1 and performs the transmitter processing for a traffic channel for a terminal (e.g., terminal 150). RX data processor 160a is an embodiment of RX data processor 160 in FIG. 1 and performs the receiver processing for the traffic channel. In GSM, data to be sent on a traffic channel is coded in groups of four data blocks, with each data block containing a specified number of information bits. Each group of four data blocks may be viewed as one data packet that contains all of the information bits for the four data blocks.

Within TX data processor 120a, a block encoder 310 performs block encoding on a packet of information bits for terminal 150 and generates parity bits for the packet. The parity bits are used for error detection by terminal 150. A convolutional encoder 312 performs convolutional encoding on the output from block encoder 310 and provides a packet of code bits. The coding scheme is determined by base station 110 based on the state (e.g., idle or traffic mode) of terminal 150 as well as the type of call (e.g., circuit switched call or packet switched call). For a packet switched call, the coding scheme may also be determined by measurements sent by terminal 150. An interleaver 314 reorders the code bits in the packet based on an interleaving scheme and provides a packet of interleaved bits. A partitioning unit 316 partitions the interleaved data packet into $N_B$ output blocks, where $N_B$ may be 4, 8, or 22 depending on the channel type (e.g., voice, circuit switched, paging, or control channel). The partitioning and interleaving may be performed in various manners. For example, the coded data may be interleaved first and then partitioned into output blocks, as shown in FIG. 3. Alternatively, the coded data packet may be partitioned first into blocks and then interleaved. The partitioning and interleaving may also be performed in one operation.

Modulator 122 modulates each output block based on a modulation scheme (e.g., GMSK or 8-PSK) selected for terminal 150 to obtain $N_B$ symbol blocks. These symbol blocks are subsequently transmitted in an assigned time slot of $N_B$ TDMA frames used for the traffic channel. For simplicity, the processing by other units between modulator 122 and demodulator 156 is not shown in FIG. 3.

Figure 4:
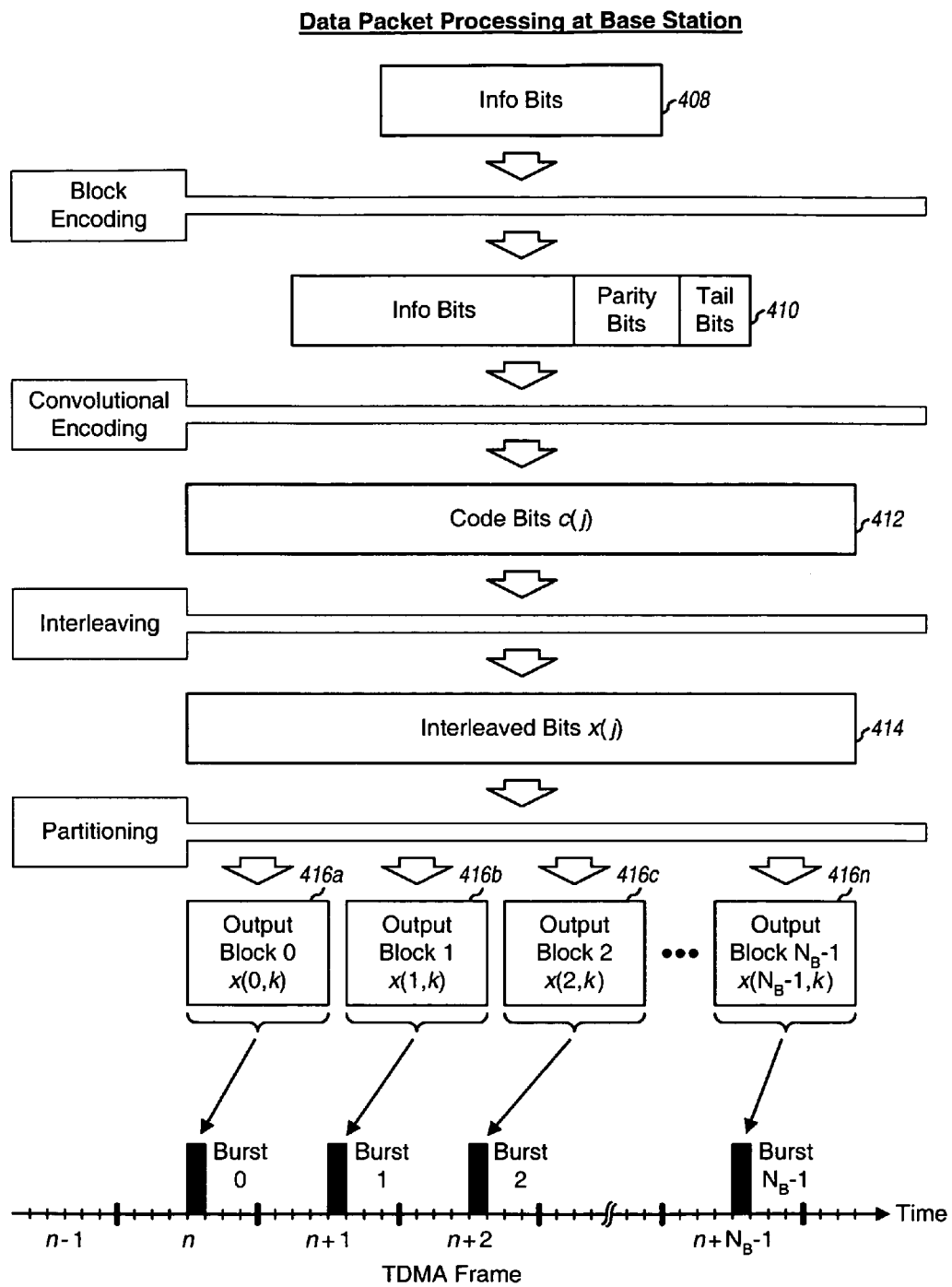
FIG. 4 illustrates the processing and transmission of a data packet in GSM.

FIG. 4 illustrates the processing and transmission of a data packet in GSM. Block encoder 310 processes a packet 408 of information bits and provides a block 410 containing information bits, parity bits, and tail bits. Convolutional encoder 312 then processes block 410 in accordance with a (e.g., rate 1/2, 1/3, 1/4, or 1/5) convolutional code and provides a block 412 of coded data. Interleaver 314 interleaves the code bits in blocks 412 and provides a block 414 of interleaved bits. Partitioning unit 316 then partitions block 414 into $N_B$ output blocks 416a through 416n.

As shown in FIG. 4, first output block 416a is transmitted in time slot x of TDMA frame n and is denoted as burst 0, second output block 416b is transmitted in time slot x of TDMA frame n+1 and is denoted as burst 1, and so on, the last output block 416n is transmitted in time slot x of TDMA frame $n+N_B-1$ and is denoted as burst $N_B-1$. Here, x is the time slot assigned to terminal 150 and n is the TDMA frame index. As shown in FIGS. 3 and 4, a data packet is encoded, interleaved, and transmitted in $N_B$ bursts. These bursts may experience different channel conditions and achieve different SNRs.

Referring back to FIG. 3, at terminal 150, demodulator 156 obtains data samples from receiver unit 154. Each data sample is a complex value with an inphase (I) component and a quadrature (Q) component. Each component is digitized to L bits (e.g., L=16). Demodulator 156 processes the data samples in accordance with an equalizer design and provides "input" soft metrics $z_{in}(i,k)$, where i denotes the i-th burst and k denotes the k-th soft metric for the burst. Demodulator 156 may perform equalization based on a maximum likelihood sequence estimator (MLSE) followed by soft-decision generation (or simply, a "soft-output MLSE"), as described by Ono, S. et al. in "An MLSE Receiver for the GSM Digital Cellular System," Proc. of the 44th IEEE Vehicular Technology Conference, Jun. 8–10, 1994, pp. 230–233. Demodulator 156 may also perform equalization based on a minimum mean square error (MMSE) equalizer or some other type of equalizer. The equalization attempts to mitigate intersymbol interference (ISI), which is a phenomenon whereby each symbol in a received signal acts as distortion to subsequent symbols in the received signal. ISI is caused by frequency selective fading, which is characterized by a frequency response that is not flat across the system bandwidth. Demodulator 156 may alternatively or additionally perform matched filtering.

A soft metric is a multi-bit value that is indicative of a single-bit (or "hard") value sent by a transmitter. For example, a soft metric may be derived by a receiver for each code bit transmitted by the transmitter. A soft metric is commonly expressed as a log likelihood ratio (LLR), which is the logarithm of the ratio of the probability of a transmitted bit being a "1" over the probability of the transmitted bit being a "0", where the probabilities are conditioned on the data samples obtained at the receiver (i.e., the "observed" data samples). A soft metric may also be expressed in other forms, and this is within the scope of the invention. For example, the soft metric may simply be equal to a received symbol obtained by the receiver for a transmitted symbol sent by the transmitter.

RX data processor 160a obtains the input soft metrics from demodulator 156. Within processor 160a, a scaler/quantizer 360 scales and quantizes the input soft metrics $z_{in}(i,k)$ for each burst and provides quantized soft metrics $z_{qn}(i,k)$ to buffer 174. After all $N_B$ bursts for the data packet have been received, a rescaler 370 rescales the quantized soft metrics $z_{qn}(i,k)$ for all $N_B$ bursts and provides rescaled soft metrics $z_{rs}(i,k)$, which are requantized (not shown in FIG. 3 for simplicity).

A deinterleaver 378 receives and deinterleaves the requantized soft metrics $z_{rq}(i,k)$ for all $N_B$ bursts and provides deinterleaved soft metrics to a Viterbi decoder 380. Viterbi decoder 380 performs convolutional decoding on the deinterleaved soft metrics and provides decoded bits. A block decoder 382 performs error detection on the decoded bits and provides a recovered data packet. Block decoder 382 also provides the status of the recovered data packet, which is "good" if the packet is decoded correctly and "bad" or "erased" if the packet is decoded in error.

The scaling/rescaling and deinterleaving may be performed in various manners. For clarity, FIG. 3 shows the deinterleaving being performed on the rescaled soft metrics after all $N_B$ bursts have been received. In a more efficient implementation, the deinterleaving is performed prior to the rescaling. For this implementation, the quantized soft metrics $z_{qn}(i,k)$ for each burst can be stored in deinterleaved order in buffer 174. Alternatively, the quantized soft metrics $z_{qn}(i,k)$ can be retrieved from buffer 174 in deinterleaved order and provided to rescaler 370. In any case, the deinterleaving can be performed by storing or retrieving the quantized soft metrics to/from the proper locations in buffer 174. Buffer 174 can thus (1) store $N_B$ bursts of quantized soft metrics for subsequent processing and (2) facilitate deinterleaving.

For GSM, the soft metrics for the Viterbi decoder are spread across $N_B$ bursts that are transmitted at different times and may achieve different SNRS. Furthermore, the soft metrics are obtained after equalization at the receiver, and the statistics of the soft metrics for each burst may not directly correspond to the SNR for the burst. Ideally, the scaling should be performed on the soft metrics for the bursts after all $N_B$ bursts have been received. However, the soft metrics provided by demodulator 156 may have many bits of resolution (e.g., 16 bits), and buffer 174 may not have sufficient capacity to store these soft metrics in its original form. In this case, the soft metrics for each burst need to be scaled and quantized to a specified number of (M) bits as the burst is received. The scaling and quantizing should be done in a manner such that system performance is minimally degraded.

To achieve good performance, the soft metrics for each burst are scaled and quantized based on the statistics obtained for the burst, as described below. This allows the soft metrics for each burst to be stored using the full resolution of the M bits. After all $N_B$ bursts have been received, the soft metrics for each burst are rescaled based on the statistics for that burst and the statistics for all $N_B$ bursts, as described below. This allows the soft metrics for each burst to be given appropriate weight in the decoding process.

Figure 5:
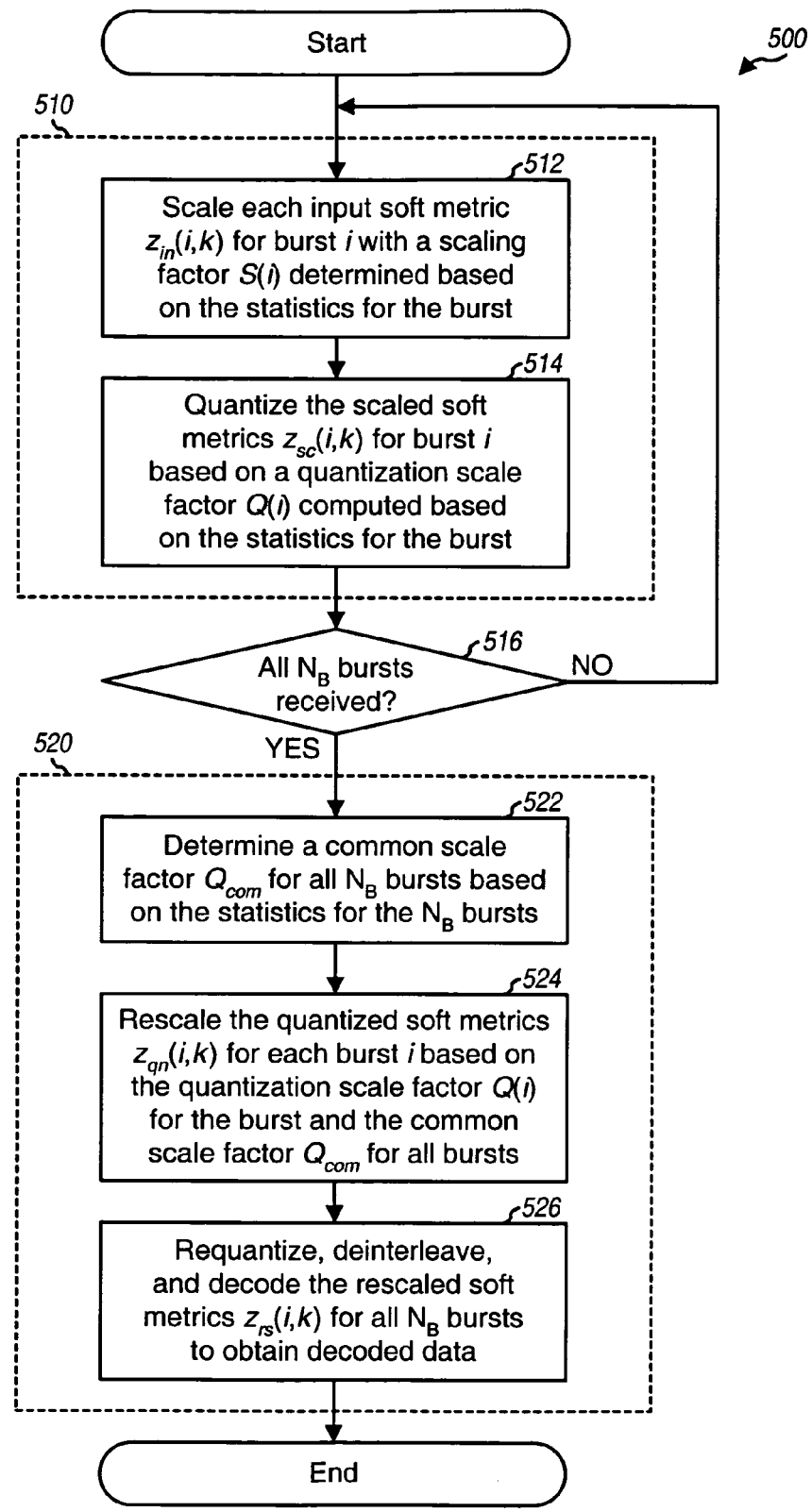
FIG. 5 shows a process for scaling, quantizing, and rescaling $N_B$ bursts of soft metrics for the data packet.

FIG. 5 shows a process 500 for scaling, quantizing, and rescaling $N_B$ bursts of soft metrics for a data packet. Block 510 is performed for each burst as the burst is received. Block 520 is performed after all $N_B$ bursts have been received.

As a burst i is received, the input soft metrics $z_{in}(i,k)$ for the burst are scaled with a scaling factor $S(i)$ to obtain scaled soft metrics $z_{sc}(i,k)$ (block 512). The scaling factor $S(i)$ is determined based on the statistics for the burst. The scaled soft metrics $z_{sc}(i,k)$ for burst i are quantized based on a quantization scale factor $Q(i)$ to obtain quantized soft metrics $z_{qn}(i,k)$, which are stored to buffer 174 (block 514). The quantization scale factor $Q(i)$ is also computed based on the statistics for the burst. Blocks 512 and 514 may be performed as described below.

A determination is then made whether or not all $N_B$ bursts for the data packet have been received (block 516). If the answer is no, then the process returns to block 512 to process the next burst. Otherwise, a common scale factor $Q_{com}$ is determined for all $N_B$ bursts based on the statistics for these bursts (block 522). The quantized soft metrics $z_{qn}(i,k)$ for each burst are then rescaled based on the quantization scale factor $Q(i)$ for the burst and the common scale factor $Q_{com}$ for all bursts (block 524). The rescaled soft metrics $z_{rs}(i,k)$ for all $N_B$ bursts are then requantized, deinterleaved, and decoded to obtain decoded data for the packet (block 526). Each of the blocks in FIG. 5 is described in further detail below.

Figure 6:
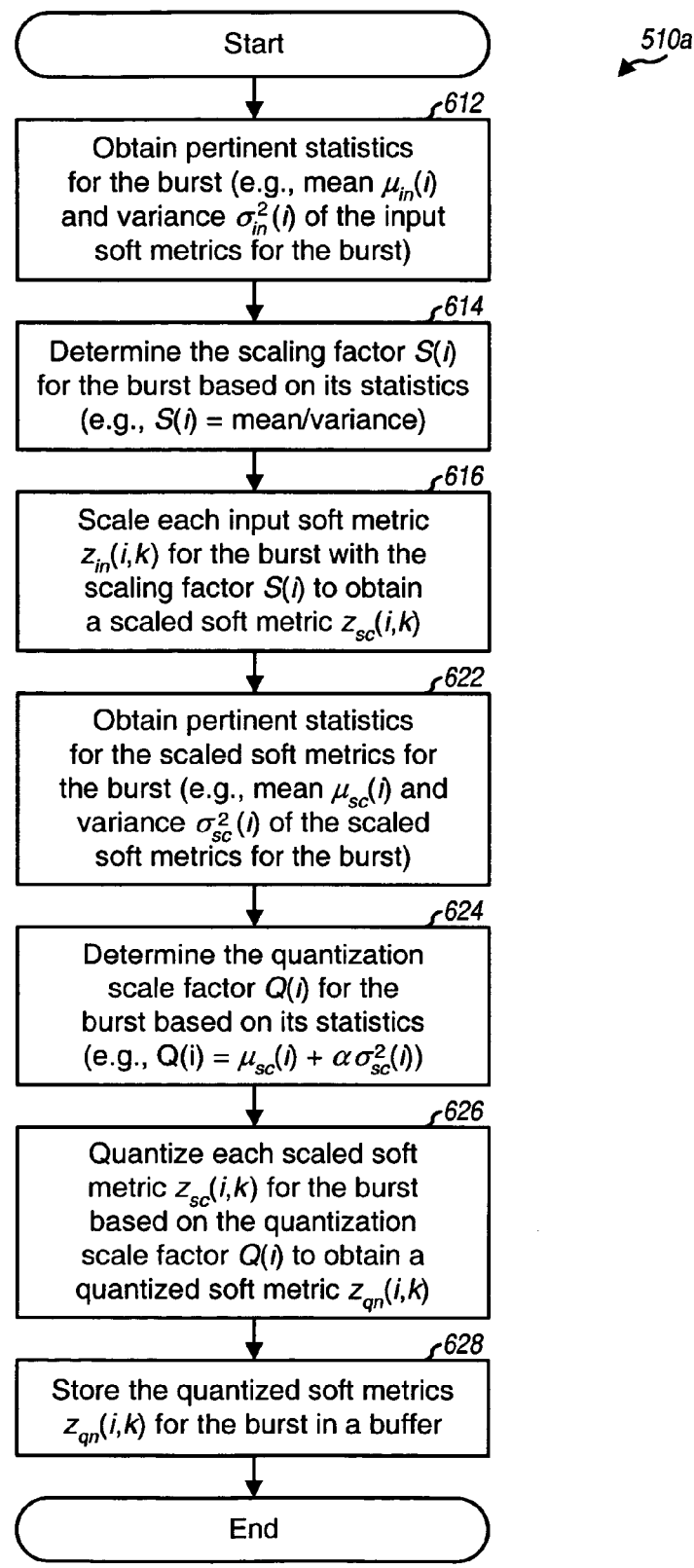
FIG. 6 shows a process for scaling and quantizing one burst of soft metrics.

FIG. 6 shows a process 510a for scaling and quantizing one burst of soft metrics. Process 510a may be used for block 510 in FIG. 5. Initially, pertinent statistics for the burst are obtained (block 612). The soft metrics can take on both positive and negative values when expressed as LLRs. The statistics may include the mean and variance of the absolute value of the input soft metrics for the burst, which can be expressed as:

$$\mu_{in}(i) = \frac{1}{N_i}\sum_{k=1}^{N_i} |z_{in}(i,k)|, \text{ and} \qquad \text{Eq (1)}$$

$$\sigma_{in}^2(i) = \frac{1}{N_i}\sum_{k=1}^{N_i} (|z_{in}(i,k)| - \mu_{in}(i))^2, \qquad \text{Eq (2)}$$

where $N_i$ is the number of soft metrics for burst i;
$\mu_{in}(i)$ is the mean of the absolute value of the input soft metrics for burst i; and
$\sigma_{in}^2(i)$ is the variance of the absolute value of the input soft metrics for burst i.

The scaling factor $S(i)$ for the burst is then determined based on its statistics (block 614), as follows:

$$S(i) = \frac{\mu_{in}(i)}{\sigma_{in}^2(i)}. \qquad \text{Eq (3)}$$

The scaling factor $S(i)$ in equation (3) is based on an assumption that the statistics of the noise in the input soft metrics is approximately Gaussian.

Each input soft metric $z_{in}(i,k)$ for the burst is scaled by the scaling factor $S(i)$ to obtain a corresponding scaled soft metric $z_{sc}(i,k)$ (block 616), as follows:

$$z_{sc}(i,k)=S(i)\cdot z_{in}(i,k), \text{ for } k=1\ldots N_i. \qquad \text{Eq (4)}$$

For the quantization, pertinent statistics for the scaled soft metrics for the burst are first obtained (block 622). For example, the mean and variance of the absolute value of the scaled soft metrics for the burst can be computed as:

$$\mu_{sc}(i) = \mu_{in}(i)\cdot S(i) = \frac{\mu_{in}^2(i)}{\sigma_{in}^2(i)} = \frac{1}{N_i}\sum_{k=1}^{N_i} |z_{sc}(i,k)|, \text{ and} \qquad \text{Eq (5)}$$

$$\sigma_{sc}^2(i) = \sigma_{in}^2(i)\cdot S^2(i) = \frac{\mu_{in}^2(i)}{\sigma_{in}^2(i)} = \frac{1}{N_i}\sum_{k=1}^{N_i} (|z_{sc}(i,k)| - \mu_{sc}(i))^2. \qquad \text{Eq (6)}$$

As shown in equations (5) and (6), the mean $\mu_{sc}(i)$ and variance $\sigma_{sc}^2(i)$ for the scaled soft metrics are related to and can be computed from the mean $\mu_{in}(i)$ and variance $\sigma_{in}^2(i)$ for the input soft metrics. Thus, the statistics for the soft metrics for the burst only need to be computed once.

The quantization scale factor $Q(i)$ for the burst is then determined based on its statistics (block 624), as follows:

$$Q(i)=\mu_{sc}(i)+\alpha\cdot\sigma_{sc}^2(i), \qquad \text{Eq (7)}$$

where $\alpha$ is a coefficient that determines the amount of headroom for the quantization. If $\mu_{sc}(i)=\sigma_{sc}^2(i)$ because of the scaling by $\mu_{in}(i)/\sigma_{in}^2(i)$, then the quantization scale factor $Q(i)$ may be simplified as $Q(i)=\gamma\cdot\mu_{sc}(i)$ where $\gamma=1+\alpha$. The coefficient $\gamma$ can be selected, for example, as a value within a range of 1.5 to 1.8.

Each scaled soft metric $z_{sc}(i,k)$ for the burst is then quantized based on the quantization scale factor $Q(i)$ to obtain a corresponding quantized soft metric $z_{qn}(i,k)$ (block 626). The quantization of a scaled soft metric to M bits (e.g., M=5) may be expressed as:

$$z_{qn}(i,k) = \begin{cases} 2^{M-1}-1 & \text{for} \quad Q(i) < z_{sc}(i,k), \\ \dfrac{z_{sc}(i,k)}{Q(i)}\cdot 2^{M-1} & \text{for} \quad -Q(i)\le z_{sc}(i,k)\le Q(i), \text{ for } k=1\ldots N_i, \\ -2^{M-1} & \text{for} \quad z_{sc}(i,k) < -Q(i). \end{cases} \qquad \text{Eq (8)}$$

For simplicity, the rounding to obtain an integer value for $z_{qn}(i,k)$ is not shown in equation (8). Equation (8) also shows the quantized soft metrics being obtained with a division by $Q(i)$. Division is more computationally intensive than multiplication in hardware and software. Thus, the inverse of $Q(i)$ can be computed instead of $Q(i)$. The quantized soft metrics can then be obtained by multiplication with the inverse of $Q(i)$.

The quantized soft metrics $z_{qn}(i,k)$ as well as the quantization scale factor $Q(i)$ for the burst are stored in buffer 174 (block 628).

FIG. 6 shows a specific scheme for scaling and quantizing the input soft metrics for a burst. The scaling factor $S(i)$ and the quantization scale factor $Q(i)$ may be derived in other manners, and this is within the scope of the invention. For example, scaling factor $S(i)$ may be a function of the mean (but not the variance). The scaling and quantizing may also be performed in other manners, and this is within the scope of the invention.

The manner in which the scaling and quantizing can be performed efficiently may be influenced by the design of demodulator 156. As an example, for the soft-output MLSE (i.e., the MLSE with soft-decision generation), the mean-to-variance ratio is equal to the inverse of the noise power for the burst, i.e., $\mu_{in}(i)/\sigma_{in}^2(i)=1/\sigma_n^2(i)$, where $\sigma_n^2(i)$ is the burst noise power. The burst noise power can be computed by (1) convolving the output of the MLSE with a channel impulse response estimate for the wireless channel to obtain estimated soft metrics $z_{est}(i,k)$, (2) subtracting the input soft metrics from the estimated soft metrics to obtain the noise, i.e., $n(i,k)=z_{est}(i,k)-z_{in}(i,k)$, and (3) computing the power of the noise $n(i,k)$ to obtain $\sigma_n^2(i)$. If the burst noise power is already computed by demodulator 156 for other uses and is available, then the scaling factor $S(i)$ can be computed based on the burst noise power as $S(i)=1/\sigma_n^2(i)$, instead of based on the mean $\mu_{in}(i)$ and variance $\sigma_{in}^2(i)$ of the input soft metrics. If the mean $\mu_{in}(i)$ and variance $\sigma_n^2(i)$ are not computed (e.g., because the scaling factor $S(i)$ is computed based on the burst noise power), then the mean $\mu_{sc}(i)$ and variance $\sigma_{sc}^2(i)$ can be computed for the scaled soft metrics, as shown in equations (5) and (6). The mean $\mu_{sc}(i)$ and variance $\sigma_{sc}^2(i)$ are then used to determine the quantization scale factor $Q(i)$ for the burst, as shown in equation (7).

For clarity, the scaling and quantizing of the soft metrics are shown as separate blocks in FIG. 6. The scaling and quantizing may also be performed in one step. In this case, the quantization scale factor for each burst may be computed as $$Q'(i) = \frac{Q(i)}{S(i)} = \gamma \cdot \mu_{in}(i).$$

The quantization may be performed directly on the input soft metrics $z_{in}(i,k)$ with $Q'(i)$ to obtain the M-bit quantized soft metrics $z_{qn}(i,k)$, as shown in equation (8) with $z_{in}(i,k)$ substituting for $z_{sc}(i,k)$ and $Q'(i)$ substituting for $Q(i)$. The quantization scale factor may also be computed as $Q'(i)=\mu_{in}(i)+\alpha \cdot \sigma_{in}^2(i)$ or in some other manner, and this is within the scope of the invention.

After all of the $N_B$ bursts have been received, the quantized soft metrics for these bursts are rescaled to obtain rescaled soft metrics for subsequent processing. The soft metrics for each burst are initially scaled and quantized (1) based only on the statistics for that burst and without regard to the statistics for the other bursts and (2) in a manner to occupy the full range of the M bits. The rescaling is performed to properly weight the soft metrics for the $N_B$ bursts in the decoding process.

In an embodiment, the rescaling is performed based on a common scale factor $Q_{com}$, which is one of the factors that determine the weight that will be given to the soft metrics for each burst. The common scale factor $Q_{com}$ is obtained based on (as a function of) the statistics for all $N_B$ bursts and may be derived in various manners. In general, more weight should be given to soft metrics for bursts with high signal quality and less or no weight should be given to soft metrics for bursts with low signal quality.

For clarity, an exemplary scheme for deriving the common scale factor $Q_{com}$ is described below. For this scheme, bursts with low signal quality below a predetermined threshold (e.g., SNR<0 dB) are considered as "bad" bursts and given no weight in the decoding process. These bad bursts also do not affect the rescaling for the remaining "good" bursts. If there are some good bursts with marginal signal quality and some good bursts with high signal quality (i.e., if the signal quality varies by a large amount among the good bursts), then the rescaling is performed such that the full range of the high quality bursts is retained. This would give the high quality bursts more weight in the decoding process. If the signal quality of the good bursts varies by a smaller amount, then the rescaling is performed based on an average of the quantization scale factors for these bursts. This would give good bursts with lower signal quality equal weight in the decoding process.

Figure 7:
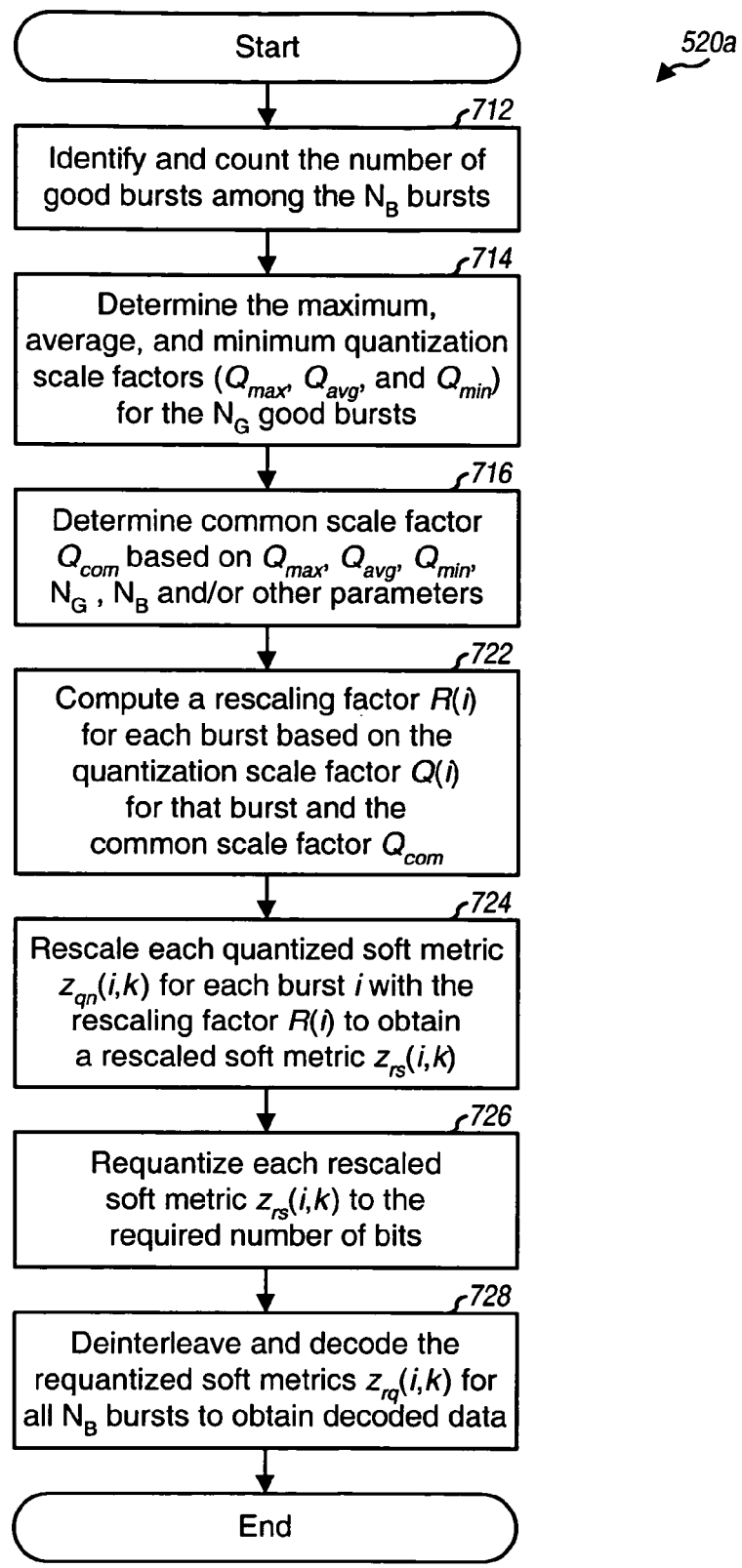
FIG. 7 shows a process for rescaling the quantized soft metrics for the $N_B$ bursts of the data packet.

FIG. 7 shows a process 520a for rescaling the quantized soft metrics for the $N_B$ bursts of one packet. Process 520a may be used for block 520 in FIG. 5.

Initially, the good bursts among the $N_B$ bursts are identified and counted (block 712). A burst may be deemed as good if its quantization scale factor $Q(i)$ is equal to or greater than a predetermined threshold $Q_{good,th}$, i.e., burst i is deemed as good if $Q(i) \geq Q_{good,th}$. The number of good bursts is denoted as $N_G$. The maximum, average, and minimum of the quantization scale factors $Q(i)$ for the $N_G$ good bursts are determined and denoted as $Q_{max}$, $Q_{avg}$, and $Q_{min}$, respectively (block 714). The common scale factor $Q_{com}$ is then derived based on the parameters $N_B$, $N_G$, $Q_{max}$, $Q_{avg}$, and $Q_{min}$ (block 716).

Figure 8:
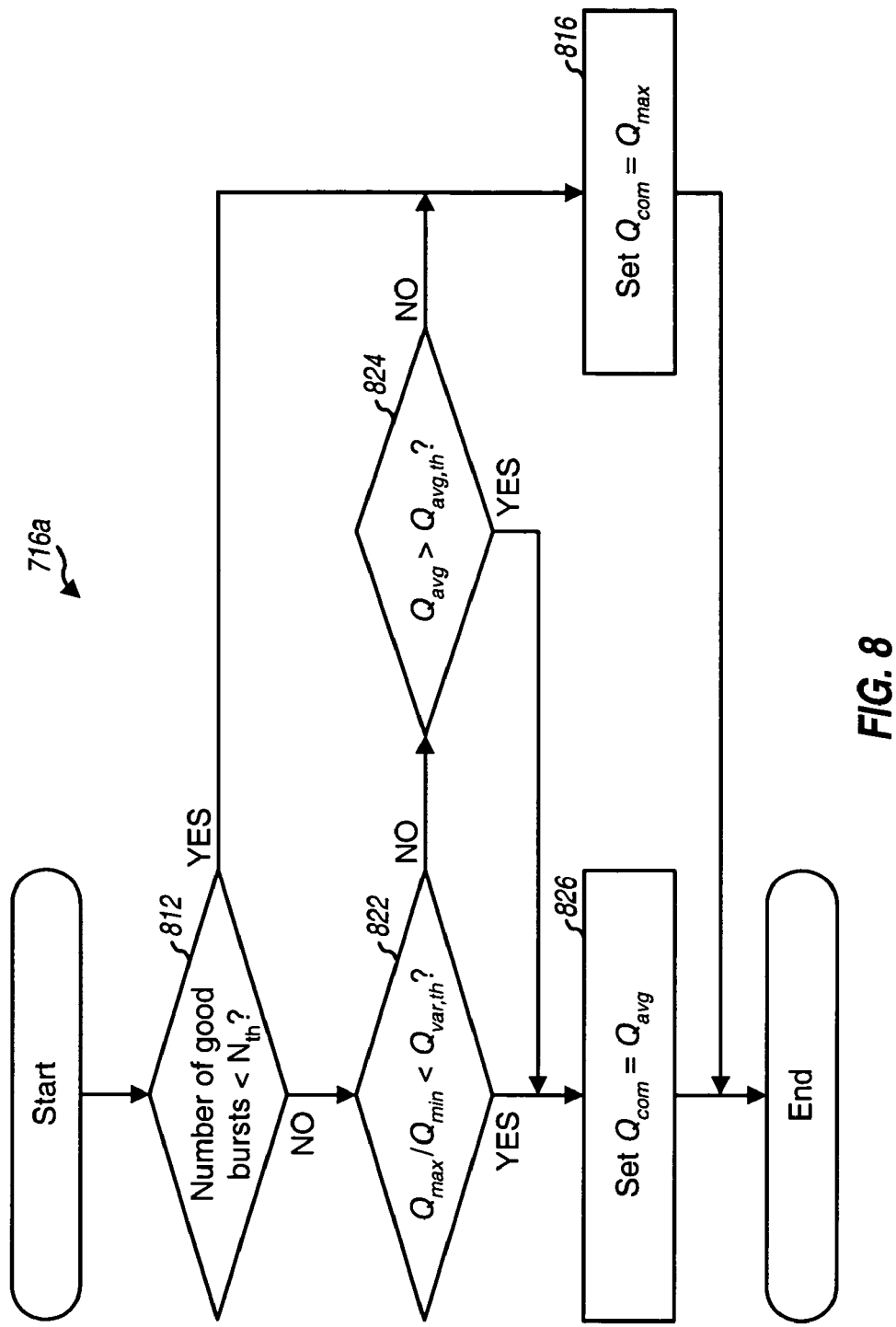
FIG. 8 shows a process for deriving a common scale factor for rescaling.

FIG. 8 shows a process 716a for deriving the common scale factor $Q_{com}$ for rescaling. Process 716a may be used for block 716 in FIG. 7. A determination is first made whether or not the number of good bursts is less than a threshold number of good bursts ($N_{th}$) (block 812). The threshold number $N_{th}$ may be set equal to half the number of bursts (e.g., $N_{th}=N_B/2$) or to some other value. If the answer is 'yes' for block 812, then the common scale factor is set equal to the maximum quantization scale factor (i.e., $Q_{com}=Q_{max}$) (block 816). If the number of good bursts is small, where "small" for this parameter is quantified by $N_{th}$, then these good bursts are given greater weight in the decoding process by setting $Q_{com}=Q_{max}$.

If at least $N_{th}$ good bursts were received (i.e., the answer is "no" for block 812), then a determination is made whether or not the ratio of the maximum quantization scale factor to the minimum quantization scale factor ($Q_{max}/Q_{min}$) for the good bursts is less than a threshold value $Q_{var,th}$ (block 822). The ratio $Q_{max}/Q_{min}$ is indicative of the variability in the quality or SNRs of the good bursts. If the variability is sufficiently small, where "small" for this parameter is quantified by $Q_{var,th}$, then the common scale factor is set equal to the average quantization scale factor for all of the good bursts (i.e., $Q_{com}=Q_{avg}$) (block 826). This would give good bursts with lower signal quality equal weight in the decoding process. The $Q_{var,th}$ threshold may be set to six (e.g., $Q_{var,th}=6$) or some other value.

If the variability in quality is not sufficiently small (i.e., the answer is "no" for block 822), then a determination is made whether or not the average quantization scale factor is greater than a threshold value $Q_{avg,th}$ (block 824). The average quantization scale factor is indicative of the average quality of the good bursts. If the average quality is sufficiently high, where "high" for this parameter is quantified by $Q_{avg,th}$, then the common scale factor is set equal to the average quantization scale factor for the $N_G$ good bursts (i.e., $Q_{com}=Q_{avg}$) (block 826). Otherwise, the common scale factor is set equal to the maximum quantization scale factor (i.e., $Q_{com}=Q_{max}$) (block 816). The $Q_{avg,th}$ threshold may be set to three (e.g., $Q_{avg,th}=3$) or some other value.

FIG. 8 shows a specific embodiment for deriving the common scale factor $Q_{com}$ for rescaling. $Q_{com}$ may also be derived in other manners and based on other functions of the statistics of the $N_B$ bursts, and this is within the scope of the invention. In general, the derivation of $Q_{com}$ may (1) take into account the parameters described above ($N_B$, $N_G$, $Q_{max}$, $Q_{avg}$, $Q_{min}$, $Q_{var,th}$, and $Q_{avg,th}$) and/or other parameters, (2) consider the criteria described above (e.g., relative number of good bursts, variability in the quality of the good bursts, and absolute value of the average quality) and/or other criteria, and (3) use other functions of the parameters and criteria.

Referring back to FIG. 7, a rescaling factor R(i) is computed for each burst based on the quantization scale factor Q(i) for that burst and the common scale factor $Q_{com}$ (block 722), as follows:

$$R(i) = \begin{cases} 0 & \text{for } Q(i) < Q_{good,th} \\ \frac{Q(i)}{Q_{com}} & \text{otherwise.} \end{cases} \quad \text{Eq (9)}$$

The rescaling factor R(i) for a bad burst is set to zero to give that burst no weight in the decoding process. In equation (9), a burst is considered "bad" if its quantization scale factor Q(i) is less than the $Q_{good,th}$ threshold value.

Each quantized soft metric $z_{qn}(i,k)$ for each burst is retrieved from buffer 174 and rescaled by the rescaling factor R(i) for that burst to obtain a corresponding rescaled soft metric $z_{rs}(i,k)$ (block 724), as follows:

$$z_{rs}(i,k) = R(i) \cdot z_{qn}(i,k), \text{ for } k=1\ldots N_i. \quad \text{Eq (10)}$$

Each rescaled soft metric $z_{rs}(i,k)$ is then requantized to the required number of bits (block 726). Typically, the rescaled soft metrics are requantized to the same number of bits with which the soft metrics were stored in buffer 174, which is M bits. In this case, the requantization can be achieved by saturating the rescaled soft metrics to M bits. If $Q_{com} = Q_{max}$, then all of the rescaled soft metrics will be M bits or less and saturating is not needed. If $Q_{com} = Q_{avg}$, then the rescaled soft metrics for bursts with $Q(i) > Q_{avg}$ may need to be saturated to obtain M-bit rescaled soft metrics.

The requantized soft metrics $z_{rq}(i,k)$ for all $N_B$ bursts are deinterleaved and decoded to obtain the decoded data for the packet (block 728). Since the rescaling factors for bad bursts are set to zero for the embodiment described above, only the requantized soft metrics for the $N_G$ good bursts are used for the decoding process.

The techniques described herein may advantageously be used for incremental redundancy (IR) transmission whereby portions of a data packet are retransmitted due to errors at the receiver. As an example, each of the $N_B$ bursts may include an error detection value (e.g., a CRC value, a checksum, and so on) that allows the receiver to determine whether or not the burst was correctly received by the receiver. The receiver can signal to the transmitter which bursts have been incorrectly received, and the transmitter can retransmit these bursts. The receiver can process the transmitted and retransmitted bursts in various manners to decode the packet.

In one scheme, the receiver substitutes the error bursts with the retransmitted bursts and discards the error bursts. Each retransmitted burst can be scaled and quantized based on its statistics, in the same manner as for a transmitted burst. All of the $N_B$ bursts (where zero, one, or multiple bursts can be retransmitted bursts) are then rescaled based on their statistics, requantized, deinterleaved, and decoded, as described above.

In another scheme, the receiver combines the transmitted version and retransmitted versions (if any) for each of the $N_B$ bursts to obtain a composite burst. The combining of all versions of a given burst i can be expressed as:

$$z'_{sc}(i,k) = \frac{1}{N_{ver,i}} \sum_{j=1}^{N_{ver,i}} S_j(i) \cdot z_{in,j}(i,k), \text{ and} \quad \text{Eq (11)}$$

where $N_{ver,i}$ is the number of versions available for burst i; $z_{in,j}(i,k)$ is the input soft metrics for the j-th version/transmission of burst i; $S_j(i)$ is the scaling factor for the j-th version of burst i; and $z'_{sc}(i,k)$ is the scaled soft metrics for composite burst i.

The scaling factor $S_j(i)$ for each version of burst i is determined based on the statistics for that version, as follows:

$$S_j(i) = \frac{\mu_{in,j}(i)}{\sigma^2_{in,j}(i)}, \quad \text{Eq (12)}$$

where $\mu_{in,j}(i)$ is the mean of the absolute value of the input soft metrics for the j-th version of burst i; and $\sigma_{in,j}^2(i)$ is the variance of the absolute value of the input soft metrics for the j-th version of burst i.

All of the $N_B$ bursts (where zero, one, or multiple bursts can be composite bursts) are then rescaled based on their statistics, requantized, deinterleaved, and decoded, as described above.

In yet another scheme, the receiver combines a current retransmitted version and a prior combined version (if any) for each of the $N_B$ bursts to obtain a new combined version for the burst. For the first transmission, the receiver performs scaling, quantization, and rescaling for the $N_B$ bursts in accordance with a common scale factor, $Q_{com,1}$, derived for the first transmission, as described above. The rescaled soft metrics $z_{in,1}(i,k)$ for the first transmission are then decoded. If there is a decoding failure, then the rescaled soft metrics $z_{in,1}(i,k)$ and the common scale factor $Q_{com,1}$ are stored. For the first retransmission, the receiver performs scaling, quantization, and rescaling for the bursts in the retransmission in accordance with a common scale factor, $Q_{com,2}$, derived for the retransmission, in the same manner as for the first transmission. The receiver then scales the rescaled soft metrics $z_{in,1}(i,k)$ for the first transmission and the rescaled soft metrics $z_{in,2}(i,k)$ for the first retransmission based on a function of the common scale factors $Q_{com,1}$ and $Q_{com,2}$. As an example, the rescaled soft metrics $z_{in,1}(i,k)$ may be scaled by $Q_{com,1}/(Q_{com,1}+Q_{com,2})$ to obtain $z'_{in,1}(i,k)$, and the rescaled soft metrics $z_{in,2}(i,k)$ may be scaled by $Q_{com,2}/(Q_{com,1}+Q_{com,2})$ to obtain $z'_{in,2}(i,k)$. Other functions of $Q_{com,1}$ and $Q_{com,2}$ may also be used. The receiver then combines $z'_{in,1}(i,k)$ and $z'_{in,2}(i,k)$ to obtain combined rescaled soft metrics $z''_{in,2}(i,k)$, which are then decoded. If there is a decoding failure, then the combined rescaled soft metrics $z''_{in,2}(i,k)$ and a combined common scale factor, $Q''_{com,2} = Q_{com,1} + Q_{com,2}$, are stored. For the next retransmission, the receiver processes the bursts in the new retransmission and combines these bursts with the stored bursts in similar manner as for the first retransmission.

The scaling, quantizing, and rescaling techniques described herein provide good performance for a transmission sent as bursts that observe different channel conditions and achieve different signal quality. The scaling and quantizing of each burst (as it is received) based on its statistics allow the soft metrics to be stored (1) with a limited number of (M) bits, thereby reducing storage requirement, and (2) with the full resolution available for these M bits. The rescaling of the quantized soft metrics for all bursts based on their statistics allows these soft metrics to be given appropriate weight in the decoding process, thereby improving performance.

The techniques described herein can provide better performance than the conventional method that scales all bursts with a single scaling factor and the conventional method that scales each burst based on the average SNR of multiple prior bursts. These techniques can also provide improved performance for messages received following a discontinuous transmission (DTX), such as paging messages that are commonly sent in cellular systems.

The scaling, quantizing, and rescaling techniques described herein may be implemented by various means. For example, these techniques may be implemented in hardware, software, or a combination thereof. For a hardware implementation, the processing units used to perform scaling, quantizing, and rescaling may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the scaling, quantizing, and rescaling techniques may be implemented with modules (e.g., procedures, functions, and so on) that perform the functions described herein. The software codes may be stored in a memory unit (e.g., memory unit 172 in FIG. 1) and executed by a processor (e.g., controller 170). The memory unit may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of processing a data transmission sent as a plurality of bursts in a wireless communication system, comprising:

scaling input soft metrics for each of the plurality of bursts based on statistics for the burst to obtain scaled soft metrics for the burst; and rescaling the scaled soft metrics for each of the plurality of bursts based on the statistics for the burst and the statistics for the plurality of bursts to obtain rescaled soft metrics for decoding.

2. The method of claim 1, wherein the input soft metrics are log likelihood ratios (LLRs).

3. The method of claim 1, wherein the input soft metrics are multi-bit values obtained for transmitted code bits.

4. The method of claim 1, wherein the rescaling includes determining a common scale factor based on the statistics for the plurality of bursts, determining a scale factor for each of the plurality of bursts based on the statistics for the burst, and rescaling the scaled soft metrics for each of the plurality of bursts based on the scaling factor for the burst and the common scale factor.

5. The method of claim 1, further comprising:

storing rescaled soft metrics for a first transmission of the plurality of bursts;

deriving rescaled soft metrics for a second transmission of the plurality of bursts; and scaling and combining the rescaled soft metrics for the first transmission and the rescaled soft metrics for the second transmission to obtain combined rescaled soft metrics for decoding.

6. The method of claim 1, wherein the wireless communication system is a Global System for Mobile Communications (GSM) system.

7. The method of claim 1, wherein the plurality of bursts are transmitted in non-continuous time intervals.

8. The method of claim 1, wherein the statistics for each of the plurality of bursts include a mean for the input soft metrics for the burst.

9. The method of claim 8, wherein the statistics for each of the plurality of bursts further include a variance for the input soft metrics for the burst.

10. The method of claim 1, further comprising:

determining a scaling factor for each of the plurality of bursts based on a mean of the input soft metrics for the burst, and wherein the input soft metrics for each burst are scaled based on the scaling factor for the burst.

11. The method of claim 10, wherein the scaling factor for each of the plurality of bursts is further determined based on a variance of the input soft metrics for the burst.

12. The method of claim 1, further comprising:

quantizing the scaled soft metrics for each of the plurality of bursts based on the statistics for the burst to obtain quantized soft metrics for the burst, and wherein the rescaling is performed on the quantized soft metrics.

13. The method of claim 12, wherein the scaling and quantizing are performed with one arithmetic operation on the input soft metrics using one scale factor.

14. The method of claim 12, wherein the rescaling includes determining a common scale factor based on the statistics for the plurality of bursts, determining a quantization scale factor for each of the plurality of bursts based on the statistics for the burst, and rescaling the quantized soft metrics for each of the plurality of bursts based on the quantization scale factor for the burst and the common scale factor.

15. An apparatus in a wireless communication system, comprising:

a scaling unit operative to scale input soft metrics for each of a plurality of bursts based on statistics for the burst to obtain scaled soft metrics for the burst, wherein the plurality of bursts are for a data transmission received via a wireless channel; and a rescaling unit operative to rescale the scaled soft metrics for the plurality of bursts based on the statistics for the burst and the statistics for the plurality of bursts to obtain rescaled soft metrics for decoding.

16. The apparatus of claim 15, further comprising:

a quantizing unit operative to quantize the scaled soft metrics for each of the plurality of bursts based on the statistics for the burst to obtain quantized soft metrics for the burst, and wherein the resealing unit is further operative to rescale the quantized soft metrics.

17. An apparatus in a wireless communication system, comprising:

means for scaling input soft metrics for each of a plurality of bursts based on statistics for the burst to obtain scaled soft metrics for the burst, wherein the plurality of bursts are for a data transmission received via a wireless channel; and means for rescaling the scaled soft metrics for the plurality of bursts based on the statistics for the burst and the statistics for the plurality of bursts to obtain rescaled soft metrics for decoding.

18. The apparatus of claim 17, further comprising:

means for quantizing the scaled soft metrics for each of the plurality of bursts based on the statistics for the burst to obtain quantized soft metrics for the burst, and wherein the rescaling is performed on the quantized soft metrics.

19. A processor readable medium for storing instructions operable in a wireless device to:

scale input soft metrics for each of a plurality of bursts based on statistics for the burst to obtain scaled soft metrics for the burst, wherein the plurality of bursts are for a data transmission received via a wireless channel; and rescale the scaled soft metrics for the plurality of bursts based on the statistics for the burst and the statistics for the plurality of bursts to obtain rescaled soft metrics for decoding.

20. A method of processing a data transmission sent as a plurality of bursts in a wireless communication system, comprising:

determining a scaling factor for each of the plurality of bursts based on statistics for the burst;

scaling input soft metrics for each of the plurality of bursts with the scaling factor for the burst to obtain scaled soft metrics for the burst;

quantizing the scaled soft metrics for each of the plurality of bursts based on a quantization scale factor for the burst to obtain quantized soft metrics for the burst;

determining a common scale factor based on quantization scale factors for the plurality of bursts; and rescaling the quantized soft metrics for each of the plurality of bursts based on the quantization scale factor for the burst and the common scale factor to obtain rescaled soft metrics for decoding.

21. The method of claim 20, wherein the scaling and quantizing for each of the plurality of bursts are performed with one arithmetic operation on the input soft metrics for the burst using one composite scale factor that includes the scaling factor and the quantization scale factor for the burst.

22. The method of claim 20, wherein the common scale factor is equal to a maximum quantization scale factor for the plurality of bursts if the number of bursts with signal quality above a predetermined threshold is less than a threshold number.

23. The method of claim 20, wherein the common scale factor is set based on an average of quantization scale factors for bursts with signal quality above a predetermined threshold.

24. The method of claim 20, further comprising:

requantizing the rescaled soft metrics for the plurality of bursts to obtain requantized soft metrics; and deinterleaving and decoding the requantized soft metrics for the plurality of bursts.

25. The method of claim 20, wherein the scaled soft metrics for each of the plurality of bursts are quantized to M bits, where M is an integer greater than one.

26. The method of claim 25, wherein the quantization scale factor for each of the plurality of bursts is selected to quantize the scaled soft metrics for the burst to full range of the M bits.

27. The method of claim 20, wherein the scaling factor and quantization scale factor for each of the plurality of bursts are determined based on a mean of the input soft metrics for the burst.

28. The method of claim 27, wherein the scaling factor and quantization scale factor for each of the plurality of bursts are further determined based on a variance of the input soft metrics for the burst.

* * * * *